(12) United States Patent
Morooka

(10) Patent No.: US 8,969,475 B2
(45) Date of Patent: Mar. 3, 2015

(54) METHOD FOR PREPARING A MODIFIED ETHYLENE-VINYL ALCOHOL COPOLYMER

(71) Applicant: The Yokohama Rubber Co., Ltd., Tokyo (JP)

(72) Inventor: Naoyuki Morooka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 57 days.

(21) Appl. No.: 13/733,366

(22) Filed: Jan. 3, 2013

(65) Prior Publication Data

US 2013/0123428 A1 May 16, 2013

Related U.S. Application Data

(62) Division of application No. 12/485,598, filed on Jun. 16, 2009, now abandoned.

(30) Foreign Application Priority Data

Aug. 25, 2008 (JP) .................................. 2008-215517

(51) Int. Cl.
| | |
|---|---|
| *C08F 8/02* | (2006.01) |
| *C08L 29/04* | (2006.01) |
| *C08L 23/26* | (2006.01) |
| *C08G 81/02* | (2006.01) |
| *B32B 27/08* | (2006.01) |
| *B32B 27/30* | (2006.01) |
| *B60C 1/00* | (2006.01) |
| *C08F 8/42* | (2006.01) |
| *F16L 11/08* | (2006.01) |
| *F16L 11/04* | (2006.01) |

(52) U.S. Cl.
CPC . *C08F 8/02* (2013.01); *B32B 27/08* (2013.01); *B32B 27/30* (2013.01); *B60C 1/0008* (2013.04); *C08F 8/42* (2013.01); *F16L 11/08* (2013.01); *F16L 2011/047* (2013.01); *B60C 2005/145* (2013.04)
USPC .......................................... 525/61; 525/253

(58) Field of Classification Search
USPC ........................... 525/253, 61; 428/424.2, 516
See application file for complete search history.

(56) References Cited

U.S. PATENT DOCUMENTS

| | | | |
|---|---|---|---|
| 2004/0096683 A1 | 5/2004 | Ikeda et al. | |
| 2004/0170787 A1* | 9/2004 | Michihata et al. | 428/35.7 |
| 2006/0128870 A1 | 6/2006 | Marx et al. | |
| 2007/0203274 A1 | 8/2007 | Korth et al. | |
| 2009/0065118 A1* | 3/2009 | Morooka | 152/510 |
| 2010/0047586 A1* | 2/2010 | Morooka | 428/424.2 |
| 2011/0034584 A1* | 2/2011 | Albert et al. | 523/156 |

FOREIGN PATENT DOCUMENTS

| | | |
|---|---|---|
| EP | 0829507 A2 | 3/1998 |
| EP | 0960901 A2 | 12/1999 |
| JP | 2003-231715 | 8/2003 |
| JP | 2006-167919 A | 6/2006 |
| WO | WO 2007123220 A1 * | 11/2007 |
| WO | WO-2007123220 A1 | 11/2007 |
| WO | WO 2008009514 A1 * | 1/2008 |
| WO | WO-2008009514 A1 | 1/2008 |

OTHER PUBLICATIONS

Kuraray EVAL-tm EVOH Resins Technical Brochure—http://www.eval.eu/media/15492/technical%20brochure_english.pdf.*
Wen J., Wilkes G.L.: "Surface modification of ethylene-vinyl alcohol (EVOH) copolymer films by the attachment of triethoxysilane functionality." Polymer Bulletin, vol. 37, (Apr. 1, 1996), pp. 51-57, XP002542244.
Database WPI Week 200650 Thomson Scientific, London, GB; AN 2006-483137, XP002542372 & JP 2006 167919 A (Bridgestone Corp) Jun. 29, 2006.

* cited by examiner

*Primary Examiner* — Ling Choi
*Assistant Examiner* — Ronald Grinsted
(74) *Attorney, Agent, or Firm* — Novak Druce Connolly Bove + Quigg LLP

(57) ABSTRACT

Ethylene-vinyl alcohol copolymers have superior gas barrier properties, but are inferior in bending fatigue resistance. The present invention improves bending fatigue resistance without reducing the gas barrier property and heat resistance. An ethylene-vinyl alcohol copolymer having an ethylene content of 20 to 50 percent by mole is modified by incorporating 0.01 to 1% mol of a structural unit expressed by the following formula (3):

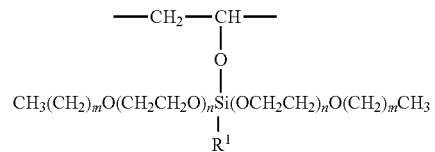

wherein, n indicates an integer of 2 to 5, m indicates an integer of 10 to 20, and $R^1$ indicates a $C_1$ to $C_{20}$ aliphatic hydrocarbon group provided that $R^1$ may contain a mercapto group, thioester group, sulfenamide, vinyl group, methacryloxy group, or acryloxy group. The modified ethylene vinyl alcohol copolymer may be used as a gas barrier resin and this gas barrier resin may be shaped or laminated and used in various applications such as in pneumatic tires and hoses.

2 Claims, No Drawings

METHOD FOR PREPARING A MODIFIED ETHYLENE-VINYL ALCOHOL COPOLYMER

CROSS REFERENCE

This application is a Divisional of co-pending application Ser. No. 12/485,598, filed on Jun. 16, 2009, and for which priority is claimed under 35 U.S.C. §120; and this application claims priority of Application No. 2008-215517 filed in Japan on Aug. 25, 2008 under 35 U.S.C. §119. The entire contents of these applications are hereby incorporated by reference.

TECHNICAL FIELD

The present invention relates to a modified ethylene-vinyl alcohol copolymer, more particularly relates to a gas barrier resin comprising the modified ethylene-vinyl alcohol copolymer and a molded article prepared from the same, particularly a pneumatic tire and a hose.

BACKGROUND ART

Ethylene-vinyl alcohol copolymers have superior gas barrier property, but have the defect that they are inferior in bending fatigue resistance. To improve on this, there is known a method of modifying an ethylene-vinyl alcohol copolymer with an epoxy compound. See Japanese Unexamined Patent Publication No. 2003-231715.

SUMMARY OF INVENTION

Technical Problem

However, if modifying an ethylene-vinyl alcohol copolymer with an epoxy compound, the bending fatigue resistance will be improved, but the gas barrier property and heat resistance (melting point) will tend to drop. The present invention addresses the matter of improving the drawback of an ethylene-vinyl alcohol copolymer, that is, the bending fatigue resistance, without reducing gas barrier property and heat resistance.

Solution to Problem

The present invention is a modified ethylene-vinyl alcohol copolymer comprising 20 to 50 percent by mole of a structural unit (1) expressed by the following formula (1):

$$-CH_2-CH_2- \quad (1):$$

a structural unit (2) expressed by the following formula (2):

(2)

and 0.01 to 1 percent by mole of a structural unit (3) expressed by the following formula (3):

(3)

wherein n indicates an integer of 2 to 7, m indicates an integer of 10 to 20, and $R^1$ indicates a $C_1$ to $C_{20}$ aliphatic hydrocarbon group or aliphatic hydrocarbon group substituted with a mercapto group, thioester group, sulfenamide, vinyl group, methacryloxy group, or acryloxy group.

The modified ethylene-vinyl alcohol copolymer is preferably prepared by melt blending an ethylene-vinyl alcohol copolymer with an alkyl polyether silane expressed by the following formula (4):

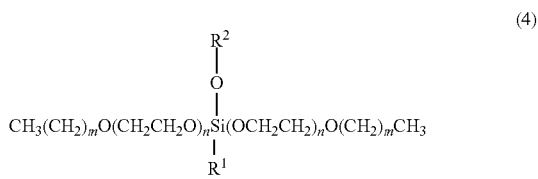

(4)

wherein $R^2$ is a methyl group or ethyl group, and $R^1$, n, and m are the same as above.

The present invention, further, is a gas barrier resin comprising the modified ethylene-vinyl alcohol copolymer.

The gas barrier resin preferably contains 100 parts by weight of the modified ethylene-vinyl alcohol copolymer and 5 to 120 parts by weight of a soft resin modified by an acid anhydride.

The present invention, further, is a molded article comprising the gas barrier resin.

The present invention, further, is a laminate comprising a layer of the gas barrier resin and a layer of a resin and/or elastomer other than the gas barrier resin.

The resin other than the gas barrier resin is preferably at least one resin selected from the group consisting of a polyolefin, polyamide, polyester, polystyrene, polyurethane, poly(vinylidene chloride), poly(vinyl chloride), polyacrylonitrile, and polycarbonate.

The elastomer other than the gas barrier resin is preferably selected from the group consisting of a diene-based elastomer, urethane-based elastomer, olefin-based elastomer, and styrene-based elastomer.

The present invention is a pneumatic tire comprising the gas barrier resin or the laminate as an air barrier layer.

The present invention, further, is a hose comprising the gas barrier resin or the laminate as an air barrier layer.

Advantageous Effects of Invention

The modified ethylene-vinyl alcohol copolymer of the present invention is superior in gas barrier property, heat resistance, and bending fatigue resistance. Because the modified ethylene-vinyl alcohol copolymer of the present invention is superior in gas barrier property, heat resistance, and bending fatigue resistance, it may be suitably used as a gas barrier resin and in molded articles, particularly pneumatic tires and hoses, requiring a gas barrier property.

DESCRIPTION OF EMBODIMENTS

The modified ethylene-vinyl alcohol copolymer of the present invention comprises a structural unit (1), a structural unit (2), and a structural unit (3).

The structural unit (1) is a so-called ethylene unit expressed by the following formula (1):

(1)

The structural unit (2) is a so-called vinyl alcohol unit expressed by the following formula (2):

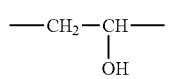

(2)

The structural unit (3) is a structural unit, containing an alkyl polyether silyl group in the side chain, expressed by the following formula (3):

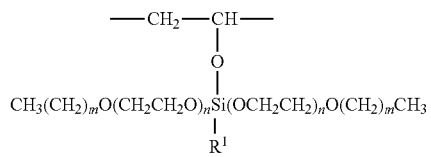

(3)

where n indicates an integer of 2 to 7, preferably an integer of 4 to 6, more preferably 5, m indicates an integer of 10 to 20, preferably an integer of 11 to 18, more preferably an integer of 12 to 16, and $R^1$ indicates an aliphatic hydrocarbon group having one to 20 carbon atoms, preferably 2 to 10 carbon atoms, more preferably 3 to 5 carbon atoms. However, $R^1$ may contain a mercapto group, thioester group, sulfenamide, vinyl group, methacryloxy group, or acryloxy group. $R^1$ is particularly preferably 3-mercaptopropyl.

The modified ethylene-vinyl alcohol copolymer comprises 20 to 50 percent by mole, preferably 30 to 45 percent by mole, more preferably 35 to 40 percent by mole of the structural unit (1). If the content of the structural unit (1) is too low, there is a tendency for the bending fatigue resistance to be insufficient, and if too high on the other hand, there is a tendency for gas barrier property to become insufficient.

The modified ethylene-vinyl alcohol copolymer comprises 0.01 to 1 percent by mole, preferably 0.03 to 0.5 percent by mole, more preferably 0.05 to 0.25 percent by mole of the structural unit (3). If the content of the structural unit (3) is too low, there is a tendency for the bending fatigue resistance to be insufficient, and if too high on the other hand, there is a tendency for gas barrier property to become insufficient.

Other than the structural unit (1) and structural unit (3) of the structural units composing the modified ethylene-vinyl alcohol copolymer, there is preferably the structural unit (2). That is, the modified ethylene-vinyl alcohol copolymer preferably comprises 49.9 to 79 percent by mole of structural unit (2). However, the modified ethylene-vinyl alcohol copolymer may comprise structural units other than structural unit (1), structural unit (2), and structural unit (3) within a scope that does not hamper the effect of the present invention. Note that, the content of each structural unit in the modified ethylene-vinyl alcohol copolymer may be measured by NMR.

The modified ethylene-vinyl alcohol copolymer is an ethylene-vinyl alcohol copolymer comprising the structural unit (1) and structural unit (2) modified by an alkyl polyether silane shown in formula (4):

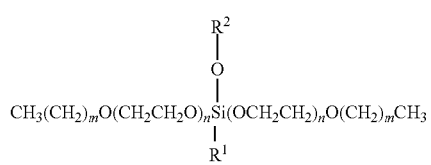

(4)

wherein $R^2$ indicates a methyl group or ethyl group, and $R^1$, n, and m are the same as above.

The modified ethylene-vinyl alcohol copolymer may be prepared by melt blending the ethylene-vinyl alcohol copolymer and the alkyl polyether silane shown in formula (4). By blending an ethylene-vinyl alcohol copolymer comprising 20 to 50 percent by mole of the structural unit (1) and the alkyl polyether silane shown in formula (4) at a temperature greater than their melting temperatures, the alkyl polyether silane shown in formula (4) reacts by condensation with the OH groups of the ethylene-vinyl alcohol copolymer whereby the alcohol is removed and the structural unit (3) is formed. The blend ratio of the ethylene-vinyl alcohol copolymer and the alkyl polyether silane shown in formula (4) is, based on 100 moles of the total of the structural unit (1) and structural unit (2) of the ethylene-vinyl alcohol copolymer, 0.01 to 1 mole of the alkyl polyether silane shown in formula (4). The conditions for melt blending are not particularly limited so long as they are conditions in which the ethylene-vinyl alcohol copolymer and the alkyl polyether silane shown in formula (4) react to form the structural unit (3), but for example a twin screw extruder may be used for processing at 200 to 270° C. for 1 to 5 minutes.

A commercial product may be used for the alkyl polyether silane shown in formula (4) or one may be synthesized. An example of a commercial product is the VP Si363 made by Evonik Degussa. Synthesis may be performed as follows. Inside a reaction container, a silane compound having a trialkoxysilyl group (for example, 3-mercaptopropyltrimethoxysilane, 3-mercaptopropyltriethoxysilane, vinyltriethoxysilane, 3-methacryloxypropyltrimethoxysilane, 3-methacryloxypropyltriethoxysilane, 3-acryloxypropyltrimethoxysilane, and 3-acryloxytriethoxysilane) is added, dodecylbenzenesulfonic acid or other acid catalyst is added, and further 2 equivalents by mole of a polyoxyethylene alkyl ether (for example, polyoxyethylene lauryl ether, polyoxyethylene cetyl ether, polyoxyethylene stearyl ether, etc.) based on one equivalent by mole of the silane compound is added, and the mixture is reacted while being agitated at 10 to 100° C. temperature, preferably 20 to 60° C. temperature, for several hours under reduced pressure conditions, whereby an alkyl polyether silane is obtained.

The gas barrier resin of the present invention comprises the modified ethylene-vinyl alcohol copolymer. The gas barrier resin of the present invention may be comprised of only the modified ethylene-vinyl alcohol copolymer, however, it may contain other substances within a scope that does not hamper the effect of the present invention. For example, the gas barrier resin of the present invention may be a mixture comprising, other than the modified ethylene-vinyl alcohol copolymer, an acid anhydride modified soft resin (hereinafter also referred to simply as a "modified soft resin"). That is, the gas barrier resin of the present invention may be a mixture of a modified ethylene-vinyl alcohol copolymer and modified soft resin. The inclusion of modified soft resin can further improve the bending fatigue resistance. The amount of the modified soft resin blended is, preferably, 5 to 120 parts by weight based on 100 parts by weight of the modified ethylene-vinyl alcohol copolymer. If the amount of the modified soft resin is too low, the improvement effect on the bending fatigue resistance will be lower, and if on the other hand, the amount of the modified soft resin is too high, there is a tendency for gas barrier property to become insufficient.

The mixture of the modified ethylene-vinyl alcohol copolymer and the modified soft resin is preferably a melt blend of the modified ethylene-vinyl alcohol copolymer and the modified soft resin. The modified ethylene-vinyl alcohol copolymer and modified soft resin may be melt blended at a temperature greater than their melting temperatures. The melt blending conditions are not particularly limited, however, for example, a twin screw extruder is used for blending at 200 to 270° C. for 1 to 5 minutes.

The acid anhydride modified soft resin is a soft resin modified by an acid anhydride. A "soft resin" means a resin having a Young's modulus of not more than 100 MPa at room temperature. Examples of the soft resin include an olefin-based polymer, ethylene-based polymer, ethylene-α-olefin copolymer, ethylene-propylene copolymer, ethylene-butene copolymer, and ethylene-propylene rubber.

By modifying the soft resin with an acid anhydride, the compatibility with the modified ethylene-vinyl alcohol copolymer can be improved. The acid anhydride in the modified soft resin can be suitably selected to give an appropriate compatibility with the modified ethylene-vinyl alcohol copolymer, however, preferably, the amount of the acid anhydride is 0.1 to 2 percent by weight based on the weight of the modified soft resin.

The acid anhydride modified soft resin includes an anhydrous maleate-modified ethylene-α-olefin copolymer. Preferably, it is an anhydrous maleate-modified ethylene-propylene copolymer or ethylene-butene copolymer. These are commercially available and can be obtained as Tafmer® MP-0620 (anhydrous maleate-modified ethylene-propylene copolymer) and Tafmer® MP-7020 (anhydrous maleate-modified ethylene-butene copolymer) from Mitsui Chemicals, Inc.

The gas barrier resin of the present invention, as mentioned above, may comprise other substances within a scope of not hampering the effect of the present invention. The gas barrier resin may be a mixture with a resin other than the modified soft resin such as poly(vinyl alcohol), ethylene-vinyl alcohol copolymer, polyamide, polyester, polyolefin, polystyrene, polyurethane resin, poly(vinylidene chloride), poly(vinyl chloride), polycarbonate, etc. Further, it may comprise additives blended into it in addition to the above ingredients such as carbon black, silica, and other fillers, vulcanizing or cross-linking agents, vulcanizing or cross-linking accelerators, various types of oils, anti-aging agents, and other various types of additives generally blended in for resin use and other rubber composition use. These additives may be kneaded in by a general method to obtain a composition to be vulcanized or cross-linked. The amounts of these additives blended may be made the conventional general amounts so long as not running counter to the object of the present invention.

The gas barrier resin of the present invention may be used as various gas barrier materials.

The gas barrier resin of the present invention may be used for various molded articles. The shape of the molded article includes, but not limited to, a film shape, cylinder shape, etc. The shaping method is not particularly limited and common methods may be used. The gas barrier resin of the present invention can be made into a film using a T-die extruder, an inflation machine, etc., and the film may be suitably used as the inner liner of a pneumatic tire because of its superior gas barrier property, heat resistance, and bending fatigue resistance. Further, cylinder-shaped ones may be suitably used as hoses.

The gas barrier resin of the present invention (hereinafter also simply referred to as a "gas barrier resin") can be laminated to a resin other than the gas barrier resin of the present invention (hereinafter also simply referred to as "another resin") or an elastomer other than the gas barrier resin of the present invention (hereinafter also simply referred to as an "elastomer") to form a laminate. A laminate comprising a gas barrier resin layer and another resin and/or elastomer layer means either a two-layer laminate comprising a gas barrier resin layer and another resin layer, a two-layer laminate comprising a gas barrier resin layer and an elastomer layer, a three-layer laminate comprising a gas barrier resin layer, another resin layer, and an elastomer layer, a multi-layer laminate comprising one or more gas barrier resin layers and one or more other resin layers, a multi-layer laminate comprising one or more gas barrier resin layers and one or more elastomer layers, or a multi-layer laminate comprising one or more gas barrier resin layers, one or more other resin layers, and one or more elastomer layers.

The other resins include a polyolefin, polyamide, polyester, polystyrene, polyurethane, polyvinylidene chloride, polyvinyl chloride, polyacrylonitrile, and polycarbonate. One among these may be used alone, or a mixture of two or more may be used.

The elastomer includes a diene-based elastomer, urethane-based elastomer, olefin-based elastomer, and styrene-based elastomer. One among these may be used alone, or a mixture of two or more may be used. Further, the other resin and elastomer may be blended together and used.

As a method of production of the laminate, layers (films) of each may be prepared and bonded with each other or a laminate may be prepared by coextrusion, however the latter is preferable. For the coextrusion, commonly used methods may be used. For example, coextrusion inflation and coextrusion blowing may be used.

A laminate comprising a layer of the gas barrier resin and a layer of another resin and/or an elastomer of the present invention may be used in various applications requiring a gas barrier property. For example, pneumatic tires or hoses may be prepared using these laminates as air barrier layers.

As a method for producing a pneumatic tire using the laminate of the present invention as an air barrier layer, a commonly used method may be used. For example, when arranging an inner liner at an inner side of a carcass layer, the laminate of the present invention is placed on a tire forming drum in a cylindrical shape, a carcass layer, belt layer, tread layer, and other members made of unvulcanized rubber used in normal tire production are overlaid in that order, then the drum is pulled out to obtain a green tire. Next, this green tire is vulcanized in accordance with normal methods to produce the desired pneumatic tire.

As a method for producing a hose using the gas barrier resin of the present invention, a commonly used method may be used. For example, a hose may be prepared as follows. First, pellets of the gas barrier resin of the present invention are used to extrude a thermoplastic elastomer composition on a mandrel coated with a release agent in advance from a resin extruder by the cross-head extrusion method to thereby form an inner tube. Further, another gas barrier resin of the present invention or a general thermoplastic elastomer may be extruded on top of the inner tube to form an inner tube outer layer. Next, when necessary, an adhesive is applied on the inner tube by coating or spraying. Further, a braiding machine is used to braid a reinforcing yarn or reinforcing steel wire on top of the inner tube. When necessary, an adhesive is coated on top of the reinforcing layer for bonding with the outer tube, then a resin is extruded from a cross-head resin extruder in the same way as the gas barrier resin of the present invention or the other generally used thermoplastic elastomer composition to form an outer tube. Finally, the mandrel is removed, whereby a hose can be obtained. The adhesive coated on the inner tube or the reinforcing layer includes an isocyanate-based, urethane-based, phenol resin-based, resorcin-based, chlorinated rubber-based, and HRH-based adhesives, however isocyanate-based and urethane-based adhesives are particularly preferable.

EXAMPLES

Examples 1 to 6 and Comparative Examples 1 to 3

To prepare a modified ethylene-vinyl alcohol copolymer, as the ethylene-vinyl alcohol copolymer, EVAL-H171B having 38 percent by mole of structural unit (1) made by Kuraray Co., Ltd. was used, while as the alkyl polyether silane, three types of alkyl polyether silane of formula (5) were used:

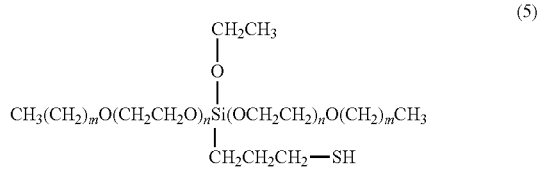

(5)

wherein n=5 and m=12 (hereinafter referred to as "alkyl polyether silane 1"), n=5 and m=16 (hereinafter referred to as "alkyl polyether silane 2"), and n=5 and m=18 (hereinafter referred to as "alkyl polyether silane 3").

The ethylene-vinyl alcohol copolymer and the alkyl polyether silane of the type and amount according to Table 1 were charged into a twin screw kneader (TEX44 made by Japan Steel Works) and melt kneaded at 230° C. for 3 minutes to obtain the modified ethylene-vinyl alcohol copolymer (Examples 1 to 6). Note that, Comparative Example 1 is an unmodified ethylene-vinyl alcohol copolymer and Comparative Examples 2 and 3 are modified ethylene-vinyl alcohol copolymers prepared using 2 percent by mole and 4 percent by mole, respectively, of glycidol in place of alkyl polyether silane.

Each modified ethylene-vinyl alcohol copolymer was continuously discharged from the extruder as strands, cooled with water, cut by a cutter into pellets, then shaped into a film by a T-die extruder (220° C.) to obtain a film having a thickness of 25 μm.

The following test methods were used to test the modified ethylene-vinyl alcohol copolymers.

[Bending Fatigue]

50 sheets of the single layer films produced according to the above and cut into sizes of 21 cm by 30 cm were produced and, based on ASTM F 392-74, were bent 50 times, 100 times, 200 times, 250 times, 1000 times, 10000 times, 20000 times, 50000 times, 75000 times, and 100000 times, then measured for the number of pinholes using a Gelbo Flex Tester made by Rigaku Kogyo. At each number of bending times, measurement was performed five times and the average of these measurements was recorded as the number of pinholes. The measurement results were plotted with the number of bending times (P) as the abscissa and the number of pinholes (N) as the ordinate. The number of bending times to one pinhole was determined by extrapolation to 2 significant figures.

[Melting Temperature]

The temperature dependency of the specific heat was measured by heat analysis (DTA or DSC), and the peak temperature was recorded as the melting temperature.

[Air Permeability Coefficient]

Based on JIS K6404, samples were prepared and air permeability was measured at 60° C. The results were shown as values indexed to the value of the air permeability coefficient of Comparative Example 1 as 100. The greater the value, the more superior the gas barrier property.

The obtained test results are shown in Table 1. It is clear that the bending fatigue resistance of the alkyl polyether silane-modified ethylene-vinyl alcohol copolymers (Examples 1 to 6) of the present invention increases significantly in comparison to the unmodified ethylene-vinyl alcohol copolymer (Comparative Example 1). Further, the bending fatigue resistance of the epoxy modified ethylene-vinyl alcohol copolymers of the prior art (Comparative Examples 2 and 3) is improved, but the heat resistance and gas barrier property drop, while the bending fatigue resistance of the alkyl polyether silane-modified ethylene-vinyl alcohol copolymers (Examples 1 to 6) of the present invention can be improved without reducing heat resistance and gas barrier property.

TABLE 1

|  | Comp. Ex. 1 | Ex. 1 | Ex. 2 | Ex. 3 | Ex. 4 | Ex. 5 | Ex. 6 | Comp. Ex. 2 | Comp. Ex. 3 |
|---|---|---|---|---|---|---|---|---|---|
| Alkyl polyether silane 1 (n = 5, m = 12) |  | 0.05 mol % | 0.08 mol % | 0.10 mol % | 0.25 mol % |  |  |  |  |
| Alkyl polyether silane 2 (n = 5, m = 16) |  |  |  |  |  | 0.10 mol % |  |  |  |
| Alkyl polyether silane 3 (n = 5, m = 18) |  |  |  |  |  |  | 0.10 mol % |  |  |
| Glycidol |  |  |  |  |  |  |  | 2 mol % | 4 mol % |
| Bending fatigue number | 12 | 229 | 240 | 320 | 310 | 250 | 260 | 240 | 300 |
| Melting temperature (° C.) | 161 | 160 | 160 | 160 | 160 | 160 | 160 | 151 | 145 |
| Air permeability | 100 | 95 | 94 | 94 | 96 | 98 | 96 | 85 | 75 |

Example 7

80 parts by weight of anhydrous maleate-modified EPM (Tafmer® MP-0620 made by Mitsui Chemicals, Inc.) were added to 100 parts by weight of the modified ethylene-vinyl alcohol copolymer of Example 3 and melt kneaded to prepare a gas barrier resin. Upon evaluation, the resin had a bending fatigue number of 52000, melting temperature of 160° C., and air permeability coefficient of 32.

Comparative Example 4

Other than the use of an unmodified ethylene-vinyl alcohol copolymer (EVAL-H171B made by Kuraray Co., Ltd. having an ethylene unit content of 38 percent by mole) in Example 7 in place of the modified ethylene-vinyl alcohol copolymer of Example 3, the gas barrier resin was prepared in the same manner as in Example 7. Upon evaluation, the resin had a bending fatigue number of 340, melting temperature of 161° C., and air permeability coefficient of 34.

From the evaluation results of Example 7 and Comparative Example 4, it is clear that using a modified ethylene-vinyl alcohol copolymer will result in a significant increase in bending fatigue resistance in comparison to the unmodified ethylene-vinyl alcohol copolymer.

The invention claimed is:

1. A method for modifying an ethylene-vinyl alcohol copolymer, comprising melt blending an ethylene-vinyl alcohol copolymer with an alkyl polyether silane expressed by the following formula (4):

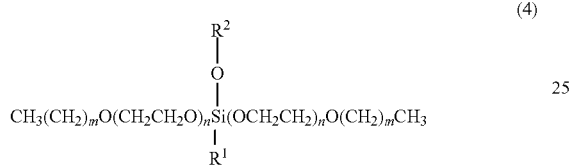

wherein n indicates an integer of 2 to 7, m indicates an integer of 10 to 20, and $R^1$ indicates a $C_1$ to $C_{20}$ aliphatic hydrocarbon group or aliphatic hydrocarbon group substituted with a mercapto group or thioester group, and $R^2$ is a methyl group or ethyl group, at a temperature of 200 to 270° C. which is greater than the melting temperatures of the ethylene-vinyl alcohol copolymer and alkyl polyether silane.

2. A method for preparing a modified ethylene-vinyl alcohol copolymer comprising 20 to 50 percent by mole of a structural unit (1) expressed by the following formula (1):

a structural unit (2) expressed by the following formula (2):

and 0.01 to 1 percent by mole of a structural unit (3) expressed by the following formula (3):

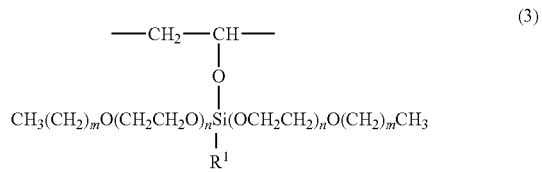

wherein n indicates an integer of 2 to 7, m indicates an integer of 10 to 20, and $R^1$ indicates a $C_1$ to $C_{20}$ aliphatic hydrocarbon group or aliphatic hydrocarbon group substituted with a mercapto group, thioester group, sulfonamide, methacryloxy group, or acryloxy group, comprising melt blending an ethylene-vinyl alcohol copolymer with an alkyl polyether silane expressed by the following formula (4):

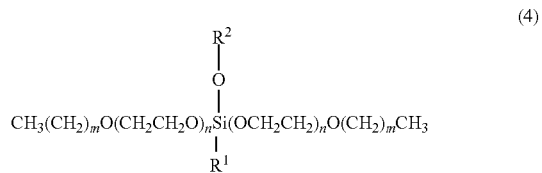

wherein $R^2$ is a methyl group or ethyl group,
at a temperature of 200 to 270° C. which is greater than the melting temperatures of the ethylene-vinyl alcohol copolymer and alkyl polyether silane.

* * * * *